(12) United States Patent
Wang et al.

(10) Patent No.: US 12,015,126 B2
(45) Date of Patent: Jun. 18, 2024

(54) LITHIUM-ION BATTERY, BATTERY MODULE, BATTERY PACK, AND AUTOMOBILE

(71) Applicant: BYD COMPANY LIMITED, Guangdong (CN)

(72) Inventors: Chuanfu Wang, Shenzhen (CN); Long He, Shenzhen (CN); Huajun Sun, Shenzhen (CN); Jianhua Zhu, Shenzhen (CN); Zhipei Lu, Shenzhen (CN); Yan Zhu, Shenzhen (CN); Shichao Hu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 718 days.

(21) Appl. No.: 17/017,461

(22) Filed: Sep. 10, 2020

(65) Prior Publication Data

US 2021/0126293 A1 Apr. 29, 2021

Related U.S. Application Data

(63) Continuation of application No. 16/707,831, filed on Dec. 9, 2019, now Pat. No. 10,790,544.

(30) Foreign Application Priority Data

Oct. 23, 2019 (CN) .......................... 201911011713.7

(51) Int. Cl.
*H01M 10/42* (2006.01)
*H01M 10/0525* (2010.01)
(Continued)

(52) U.S. Cl.
CPC ... *H01M 10/4214* (2013.01); *H01M 10/0525* (2013.01); *H01M 10/0585* (2013.01);
(Continued)

(58) Field of Classification Search
CPC ......... H01M 10/4214; H01M 10/0525; H01M 10/0585; H01M 50/112; H01M 50/147;
(Continued)

(56) References Cited

U.S. PATENT DOCUMENTS

| | | |
|---|---|---|
| 2002/0045095 A1 | 4/2002 | Taniguchi |
| 2002/0064708 A1 | 5/2002 | Asahina |

(Continued)

FOREIGN PATENT DOCUMENTS

| | | |
|---|---|---|
| CN | 1812158 A | 8/2006 |
| CN | 101202355 A | 6/2008 |

(Continued)

OTHER PUBLICATIONS

Search Report from Chinese Application No. 2019110117137 dated Oct. 23, 2019.

(Continued)

*Primary Examiner* — Cynthia K Walls
(74) *Attorney, Agent, or Firm* — Calfee, Halter & Griswold LLP

(57) ABSTRACT

The present invention provides a lithium-ion battery, including: a housing and a separator located inside the housing, where the separator separates internal space of the housing into a plurality of accommodation cavities, battery core sets are disposed inside the accommodation cavities, the battery core sets each include at least one pole shank, and the battery core sets are connected in series; and at least one separator is provided with a liquid injection hole, and the liquid injection hole is used to connect two adjacent accommodation cavities on two sides of the separator; and a block mechanism, where the block mechanism is located inside the housing, the block mechanism enables the liquid injection hole to be in a predetermined state, and the predetermined state includes an open state and a closed state. The (Continued)

battery provided in the present invention ensures isolation and safety of each battery core set while facilitating liquid injection.

20 Claims, 10 Drawing Sheets

(51) Int. Cl.
*H01M 10/0585* (2010.01)
*H01M 50/112* (2021.01)
*H01M 50/147* (2021.01)
*H01M 50/207* (2021.01)
*H01M 50/593* (2021.01)
*H01M 50/636* (2021.01)

(52) U.S. Cl.
CPC ....... *H01M 50/112* (2021.01); *H01M 50/147* (2021.01); *H01M 50/207* (2021.01); *H01M 50/593* (2021.01); *H01M 50/636* (2021.01); *H01M 2220/20* (2013.01)

(58) Field of Classification Search
CPC ............. H01M 50/207; H01M 50/593; H01M 50/636; H01M 2220/20; H01M 50/529; H01M 10/02; H01M 50/103; H01M 50/534; H01M 50/655; H01M 10/0587; H01M 10/058; H01M 50/15; H01M 50/3425; H01M 50/474; H01M 50/477; H01M 50/533; H01M 50/538; Y02T 10/7072; Y02T 90/14; Y02E 60/10
See application file for complete search history.

(56) References Cited

U.S. PATENT DOCUMENTS

| | | | |
|---|---|---|---|
| 2004/0170892 A1 | 9/2004 | Popp | |
| 2006/0166087 A1* | 7/2006 | Ogata | ............... H01M 10/0413 429/153 |
| 2008/0014499 A1 | 1/2008 | Ling | |
| 2010/0129687 A1 | 5/2010 | Kim | |
| 2012/0021303 A1 | 1/2012 | Amendola | |
| 2012/0231301 A1 | 9/2012 | Jang | |
| 2014/0060666 A1 | 3/2014 | Evans | |
| 2015/0135522 A1 | 5/2015 | Seto | |
| 2016/0164112 A1 | 6/2016 | Seipp | |
| 2016/0293929 A1 | 10/2016 | Kitaoka | |
| 2017/0040575 A1* | 2/2017 | Bang | ................... H01M 50/184 |
| 2018/0219261 A1 | 8/2018 | Drews | |
| 2018/0277904 A1 | 9/2018 | Sasakawa | |
| 2019/0044129 A1 | 2/2019 | Yadav | |
| 2019/0237776 A1 | 8/2019 | Nakaishi | |

FOREIGN PATENT DOCUMENTS

| | | | |
|---|---|---|---|
| CN | 201084772 Y | 7/2008 |
| CN | 101719562 A | 6/2010 |
| CN | 102104167 A | 6/2011 |
| CN | 202797173 U | 3/2013 |
| CN | 203150621 U | 8/2013 |
| CN | 104282864 A | 1/2015 |
| CN | 206271794 U | 6/2017 |
| CN | 107230801 A | 10/2017 |
| CN | 207368044 U | 5/2018 |
| CN | 110518156 A | 11/2019 |
| CN | 110518174 A | 11/2019 |
| EP | 1705731 A1 | 9/2006 |
| EP | 2393146 A1 | 12/2011 |
| JP | 2000021438 A | 7/2007 |
| JP | 2007172943 A | 7/2007 |
| WO | 2005119812 A1 | 12/2005 |
| WO | 2017130697 A1 | 8/2017 |

OTHER PUBLICATIONS

Search Report from Chinese Application No. 2019110122845 dated Oct. 23, 2019.
Notification of Grant Patent Right for Invention from 2019110117137 dated Jan. 10, 2020.
Notification of Grant Patent Right for Invention from 2019110122845 dated Jan. 6, 2020.
Office Action from Chinese Application 2019110117137 dated Dec. 10, 2019 with English Translation.
Office Action from Chinese Application 2019110122845 dated Dec. 10, 2019 with English Translation.
Search Report for European Patent Application No. 19214393.1 dated Jun. 17, 2020.
Search Report for European Patent Application No. 19214302.3 dated Jun. 12, 2020.

* cited by examiner

LITHIUM-ION BATTERY, BATTERY MODULE, BATTERY PACK, AND AUTOMOBILE

CROSS REFERENCE TO RELATED APPLICATION

This application is a continuation of U.S. application Ser. No. 16/707,831, filed on Dec. 9, 2019, which claims the priority of Chinese Patent Application No. 201911011713.7, filed on Oct. 23, 2019, the entire contents of which are herein incorporated by reference.

FIELD

The present invention relates to the battery field, in particular, to a lithium-ion battery, a battery module, a battery pack, and an automobile.

BACKGROUND

With the continuous popularization of new energy automobiles, a higher requirement is imposed to power batteries in the new energy automobiles in use. In particular, users require increasing endurance mileage of the new energy automobiles. Therefore, a battery pack used in the new energy automobiles needs to have an increasing overall capacity. In addition, in use of a power battery pack, internal consumption caused by internal resistance is required to be as low as possible.

A common new energy automobile generally has a height greater than 1 meter, and a length in a few meters. A power battery pack of the new energy automobile is generally placed at the bottom of the new energy automobile. Currently, a power battery pack on the market generally has a height basically the same as the height of the new energy automobile, basically greater than 1 meter, and has a length determined based on reserved space at the bottom of the new energy automobile, generally greater than 2 meters. Overall, both the length and the height of the power battery pack are greater than 1 meter. However, currently, a single battery on the market is generally about 0.3 meter long. Therefore, in the power battery pack, at least three single batteries or even more need to be arranged side by side.

To arrange a plurality of single batteries side by side, a fastening structure needs to be added for each single battery, and a peripheral power connector needs to be disposed for power connection between two adjacent single batteries, resulting in a relatively large quantity of installation structures of the single batteries, which not only increases costs, but also increases the overall weight. In addition, in a single pack, the installation structures occupy relatively large internal space of the pack, resulting in a decrease in an overall capacity of the power battery pack. More single batteries arranged side by side mean that more space is wasted. In addition, a plurality of external power connectors need to be disposed for power connection, which increases internal resistance and increases internal consumption of the power battery pack in use.

To resolve the foregoing technical problems, the patent CN201110021300.4 provides a serially connected battery pack, including a battery housing and a plurality of pole sets disposed inside the battery housing, the plurality of pole sets are connected in series, and two adjacent pole sets are separated by a separator. Therefore, compared with arranging a plurality of single batteries side by side, disposing the plurality of pole sets in the battery housing reduces the housing and external installation structures, improves space utilization, and ensures an overall capacity of the power battery pack. In addition, no external power connectors are used, and adjacent pole sets inside the housing are directly connected in series without considering connection stability and reliability of the power connectors, so that connected content can be reduced and internal consumption of the power battery pack in use can be reduced.

In the foregoing patent, because the plurality of pole sets are connected in series, a potential difference between front and rear ends is relatively high. If the plurality of pole sets connected in series share an electrolyte in a cavity, the electrolyte may decompose due to the high potential difference between the front and rear ends, resulting in a failure of a single battery. Therefore, to resolve the foregoing problem, in the foregoing patent, a separator is disposed between two adjacent pole sets, each pole set is in a cavity obtained through separation by the separator, and each cavity provides the electrolyte to a single battery.

However, in CN201110021300.4, as the separator separates internal space of the housing into a plurality of single cavities, how to inject the electrolyte into each single cavity while ensuring isolation between two adjacent cavities is a problem not considered in CN201110021300.4, and also a core problem of the solution disclosed in CN201110021300.4.

SUMMARY

An objective of the present invention is to resolve the foregoing liquid injection problem by providing a battery, a battery module, a battery pack, and an automobile, in which an electrolyte can be injected into each cavity while isolation of each cavity can be ensured.

To resolve the foregoing technical problem, the technical solutions of the present invention are as follows:

The present invention provides a lithium-ion battery, including: a housing and a separator located inside the housing, where the separator separates internal space of the housing into a plurality of accommodation cavities, battery core sets are disposed inside the accommodation cavities, the battery core sets each include at least one pole shank, and the battery core sets are connected in series; and at least one separator is provided with a liquid injection hole allowing an electrolyte to pass through, and the liquid injection hole is used to connect two adjacent accommodation cavities on two sides of the separator; and a block mechanism, where the block mechanism is located inside the housing, the block mechanism enables the liquid injection hole to be in a specified state, and the specified state includes an open state and a closed state.

In an embodiment of the present invention, when the block mechanism is in a first situation, the liquid injection hole is in the open state; when the block mechanism is in a second situation, the liquid injection hole is in the closed state; and the block mechanism is capable of switching between the first situation and the second situation.

In an embodiment of the present invention, before or during liquid injection of the lithium-ion battery, the block mechanism is in the first situation, the liquid injection hole is in the open state, and the two adjacent accommodation cavities on the two sides of the separator are connected through the liquid injection hole; and after the liquid injection of the lithium-ion battery, the block mechanism switches from the first situation to the second situation, and the block mechanism closes the liquid injection hole, so that the liquid injection hole is in the closed state.

In an embodiment of the present invention, when the lithium-ion battery is formed after the liquid injection, the block mechanism is in the first situation, the liquid injection hole is in the open state, and the two adjacent accommodation cavities on the two sides of the separator are connected through the liquid injection hole; and after the lithium-ion battery is formed after the liquid injection, the block mechanism switches from the first situation to the second situation, and the block mechanism closes the liquid injection hole, so that the liquid injection hole is in the closed state.

In an embodiment of the present invention, when the lithium-ion battery is overcharged or short-circuited, the block mechanism switches from the second situation to the first situation, the block mechanism enables the liquid injection hole to be in the open state, and the two adjacent accommodation cavities on the two sides of the separator are connected through the liquid injection hole.

In an embodiment of the present invention, when the liquid injection hole is in the closed state, the block mechanism is at least partially located in the liquid injection hole, and the block mechanism closes the liquid injection hole, to block connection between the two adjacent accommodation cavities through the liquid injection hole.

In an embodiment of the present invention, a plurality of separators are disposed inside the housing, one separator is disposed between two adjacent battery core sets, the plurality of separators separate the internal space of the housing into a plurality of accommodation cavities, and each accommodation cavity includes at least one battery core set; and at least one separator is provided with a liquid injection hole, the block mechanism is at least partially located in the liquid injection hole, and the block mechanism closes the liquid injection hole, so that the liquid injection hole is in the closed state, and connection between the two adjacent accommodation cavities through the liquid injection hole is blocked.

In an embodiment of the present invention, in the first situation, the block mechanism is located at a first position in the housing; and in the second situation, the block mechanism is located at a second position in the housing.

In an embodiment of the present invention, the separator is provided with a block mechanism placement space, the block mechanism is located inside the block mechanism placement space, the first position and the second position are formed in the block mechanism placement space, and the block mechanism is capable of moving between the first position and the second position under an action of an external force; when the block mechanism is located at the first position, the liquid injection hole is in the open state, the two adjacent accommodation cavities are connected through the liquid injection hole; and when the block mechanism is located at the second position, the block mechanism closes the liquid injection hole, the liquid injection hole is in the closed state, and connection between the two adjacent accommodation cavities through the liquid injection hole is blocked.

In an embodiment of the present invention, the external force is selected from one or more of gravity, electromagnetic force, inertia force, or thermal force.

In an embodiment of the present invention, the block mechanism placement space is connected with the liquid injection hole.

In an embodiment of the present invention, the block mechanism placement space and the liquid injection hole are cross-arranged, the liquid injection hole is separated by the block mechanism placement space into a first liquid injection hole and a second liquid injection hole, and the first liquid injection hole and the second liquid injection hole both are connected with the block mechanism placement space.

In an embodiment of the present invention, the block mechanism is in any shape of a cylinder, an elliptical cylinder, a sheet, or a sphere.

In an embodiment of the present invention, the block mechanism is in an interference fit connection with an inner wall of the block mechanism placement space.

In an embodiment of the present invention, the block mechanism is a magnetic substance with magnetism.

In an embodiment of the present invention, the block mechanism is covered by an elastic sleeve.

In an embodiment of the present invention, the housing includes a housing body with an opening on an end portion and a cover plate disposed at the opening of the housing body, the opening is located on the end portion of the housing along a first direction, and the cover plate is provided with a liquid injection channel; and the separator separates the internal space of the housing along the first direction into the plurality of accommodation cavities, and the battery core sets are arranged along the first direction and connected in series.

In an embodiment of the present invention, each battery core set includes a first electrode lead-out part and a second electrode lead-out part that are used to lead out a current, and a first electrode lead-out part and a second electrode lead-out part of at least one battery core set are arranged along the first direction on two opposite sides of the battery core set respectively; and a length direction of the battery core set extends along the first direction.

In an embodiment of the present invention, the first direction is a length direction of the lithium-ion battery.

In an embodiment of the present invention, the lithium-ion battery is roughly rectangular, the lithium-ion battery has a length, a height, and a depth, the length is greater than the height, the height is greater than the depth, and the length of the lithium-ion battery is 400 to 2500 mm.

In an embodiment of the present invention, the battery includes a battery core connector, and the battery core sets are connected in series by using the battery core connector.

In an embodiment of the present invention, the two adjacent battery core sets are connected in series by using the battery core connector, and the battery core connector passes through the separator between the two adjacent battery core sets.

In an embodiment of the present invention, the battery core connector and the separator are integrally formed.

In an embodiment of the present invention, the battery core connector includes a copper connection portion and an aluminum connection portion that is connected to the copper connection portion, and the copper connection portion and the aluminum connection portion are connected inside the separator.

In an embodiment of the present invention, the housing is a metal housing, the battery further includes an isolating film, the isolating film is located between the housing and the battery core sets, and the isolating film and the separator form the accommodation cavities.

In an embodiment of the present invention, the housing is a metal housing, the battery further includes an isolating bag, the battery core sets are located inside the isolating bag, and the separator separates internal space of the isolating bag into a plurality of accommodation cavities.

In an embodiment of the present invention, a sample line that is used to sample the battery core set is disposed inside the housing.

An embodiment of the present invention discloses a lithium-ion battery, including: a housing; a separator, where the separator is located inside the housing, and the separator separates internal space of the housing into a plurality of accommodation cavities; battery core sets, where the battery core sets are disposed inside the accommodation cavities, the battery core set includes at least one pole shank, the battery core sets are connected in series, at least one separator is provided with a liquid injection hole allowing an electrolyte to pass through, and the liquid injection hole is used to connect two adjacent accommodation cavities on two sides of the separator; and a block mechanism, where the block mechanism is at least partially located in the liquid injection hole, and the block mechanism closes the liquid injection hole, to block connection between the two adjacent accommodation cavities through the liquid injection hole.

In an embodiment of the present invention, a plurality of separators are disposed inside the housing, one separator is disposed between two adjacent battery core sets, the plurality of separators separate the internal space of the housing into a plurality of accommodation cavities, and each accommodation cavity includes at least one battery core set.

In an embodiment of the present invention, at least one separator is provided with a block mechanism placement space, the block mechanism is located inside the block mechanism placement space, a first position and a second position are formed in the block mechanism placement space for accommodating the block mechanism, the block mechanism is located at the second position, and the block mechanism is capable of switching from the second position to the first position or from first position to the second position under an action of an external force.

In an embodiment of the present invention, the block mechanism placement space and the liquid injection hole are cross-arranged, the liquid injection hole is separated by the block mechanism placement space into a first liquid injection hole and a second liquid injection hole, and the first liquid injection hole and the second liquid injection hole are connected with the block mechanism placement space.

In an embodiment of the present invention, the block mechanism is in any shape of a cylinder, an elliptical cylinder, a sheet, or a sphere.

In an embodiment of the present invention, the block mechanism is sheet provided with a nick that is broken under preset pressure.

In an embodiment of the present invention, the housing includes a housing body with an opening on an end portion and a cover plate disposed at the opening of the housing body, the opening is located on the end portion of the housing along a first direction, and the cover plate is provided with a liquid injection channel; and the separator separates the internal space of the housing along the first direction into the plurality of accommodation cavities, and the battery core sets are arranged along the first direction and connected in series.

In an embodiment of the present invention, each battery core set includes a first electrode lead-out part and a second electrode lead-out part that are used to lead out a current, and a first electrode lead-out part and a second electrode lead-out part of at least one battery core set are arranged along the first direction on two opposite sides of the battery core set respectively; and a length direction of the battery core set extends along the first direction.

In an embodiment of the present invention, the first direction is a length direction of the lithium-ion battery, the lithium-ion battery is roughly rectangular, the lithium-ion battery has a length, a height, and a depth, the length is greater than the height, the height is greater than the depth, and the length of the lithium-ion battery is 400 to 2500 mm.

In an embodiment of the present invention, the housing includes a battery core connector, and the battery core sets are connected in series by using the battery core connector.

In an embodiment of the present invention, the two adjacent battery core sets are connected in series by using the battery core connector, and the battery core connector passes through the separator between the two adjacent battery core sets.

In an embodiment of the present invention, the battery core connector and the separator are integrally formed.

In an embodiment of the present invention, the battery core connector includes a copper connection portion and an aluminum connection portion that is connected to the copper connection portion, and the copper connection portion and the aluminum connection portion are connected inside the separator.

In an embodiment of the present invention, the housing is a metal housing, the battery further includes an isolating film, the isolating film is located between the housing and the battery core sets, and the isolating film and the separator form the accommodation cavities.

In an embodiment of the present invention, the housing is a metal housing, the battery further includes an isolating bag, the battery core sets are located inside the isolating bag, and the separator separates internal space of the isolating bag into a plurality of accommodation cavities.

The present invention further provides a battery set, including a plurality of lithium-ion batteries provided in the present invention.

The present invention further provides a battery pack, including a plurality of lithium-ion batteries provided in the present invention or including a plurality of battery modules provided in the present invention.

The present invention further provides an automobile, including the battery module provided in the present invention or the battery pack provided in the present invention.

Compared with the prior art, the present invention achieves the following beneficial effects:

The battery provided in the present invention is provided with a liquid injection hole on a separator, the liquid injection hole is used to connect two adjacent accommodation cavities, and during liquid injection, the accommodation cavities are connected through the liquid injection hole. Therefore, even when an electrolyte is injected into one accommodation cavity, the electrolyte can flow through the liquid injection hole to another accommodation cavity, so that the electrolyte can be injected into each accommodation cavity well. Besides, the separator is provided with a block mechanism, the block mechanism enables the liquid injection hole to be in a specified state, and after the liquid injection is completed, the block mechanism closes the liquid injection hole, so that the two adjacent accommodation cavities are isolated from each other, and the electrolyte does not flow between the two adjacent accommodation cavities to avoid mutual impact, or decompose due to a high voltage difference, thereby ensuring safety and service life of the lithium-ion battery. In addition, when the lithium-ion battery is overcharged or short-circuited, the block mechanism enables the liquid injection hole to be open and in an open state for air discharge and pressure relief.

Figure 1:
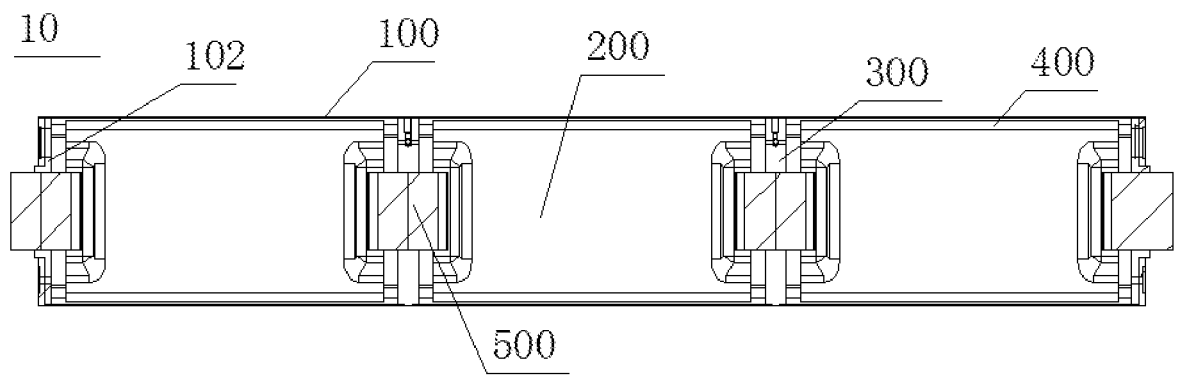
FIG. 1 is a cross-sectional view of an overall structure of a lithium-ion battery according to an embodiment of the present invention.

Reference numerals include:

battery 10; housing 100; cover plate 102; battery core set 200; battery core 201; tab 202; and power connection area 203; and separator 300; liquid injection hole 301; first liquid injection hole 3011; second liquid injection hole 3012; block mechanism 302; rubber sleeve 3025; metallic ball 3026; block mechanism placement space 303; package structure 305; accommodation cavity 400; battery core connector 500; copper connection portion 501; aluminum connection portion 502; isolating film 600; and tray 700.

DETAILED DESCRIPTION

Reference will be made in detail to embodiments of the present invention, and an example of the embodiment is shown in the accompanying drawings, the same or similar elements and the elements having same or similar functions are denoted by like reference numerals throughout the descriptions. The embodiments described herein with reference to drawings are explanatory, illustrative, and should be used to generally understand the present invention. The embodiments shall not be construed to limit the present invention.

In the description of the present invention, it should be understood that, terms such as "length", "height", "up", "down", "front", "rear", "left", "right", "vertical", "horizontal", "top", "bottom", "inside", and "outside" indicate an orientation or position relationship based on the orientation or position shown in the accompanying drawings. These terms are merely for the convenience of describing the present invention and simplifying the description, and not to indicate or imply that the device or element referred to must have a particular orientation, be constructed and operated in a particular orientation, and therefore cannot be understood as a limitation on the present invention.

In addition, terms "first" and "second" are merely for description, and cannot be understood to indicate or imply relative importance or to imply a quantity of technical features indicated. Thus, features defined by "first" and "second" may explicitly or implicitly include one or more of these features. In the description of the present invention, "plurality of" means two or more, unless otherwise specifically defined.

In the present invention, terms such as "installation", "connected", "connection", and "fastening" shall be understood in a broad sense unless otherwise expressly specified and defined, which for example, may be fixedly connected, detachably connected, or integrally formed; may be mechanically or electrically connected; may be directly connected or indirectly connected by using an intermediate medium; or may be connection between two elements or interaction between two elements. For a person of ordinary skill in the art, specific meanings of the terms in the present invention may be understood based on a specific situation.

The present invention provides a lithium-ion battery, including: a housing and a separator located inside the housing, where the separator separates internal space of the housing into a plurality of accommodation cavities, battery core sets are disposed inside the accommodation cavities, the battery core sets each include at least one pole shank, and the battery core sets are connected in series; and at least one separator is provided with a liquid injection hole allowing an electrolyte to pass through, and the liquid injection hole is used to connect two adjacent accommodation cavities on two sides of the separator; and a block mechanism, where the block mechanism is located inside the housing, the block mechanism enables the liquid injection hole to be in a specified state, and the specified state includes an open state and a closed state.

Compared with the prior art, the present invention achieves the following beneficial effects:

The battery provided in the present invention is provided with a liquid injection hole on a separator, the liquid injection hole is used to connect two adjacent accommodation cavities, and during liquid injection, the accommodation cavities are connected through the liquid injection hole. Therefore, even when an electrolyte is injected into one accommodation cavity, the electrolyte can flow through the liquid injection hole to another accommodation cavity, so that the electrolyte can be injected into each accommodation cavity well. Besides, the separator is provided with a block mechanism, the block mechanism enables the liquid injection hole to be in a specified state, and after the liquid injection is completed, the block mechanism closes the liquid injection hole, so that the two adjacent accommodation cavities are isolated from each other, and the electrolyte does not flow between the two adjacent accommodation cavities to avoid mutual impact, or decompose due to a high voltage difference, thereby ensuring safety and service life of the lithium-ion battery. In addition, when the lithium-ion battery is overcharged or short-circuited, the block mechanism enables the liquid injection hole to be open and in an open state for air discharge and pressure relief.

In some embodiments of the present invention, the liquid injection hole has a function of allowing the electrolyte to pass through during liquid injection, so that the electrolyte can flow to different accommodation cavities after injection once. Moreover, after the liquid injection is completed, in a use process, the block mechanism normally closes the liquid injection hole, so that the liquid injection hole is in a closed state. Furthermore, in some preferred embodiments, when the lithium-ion battery is overcharged or short-circuited, the liquid injection hole of the lithium-ion battery is open, and the block mechanism does not close the liquid injection hole, but opens the liquid injection hole for air discharge.

In some embodiments, the liquid injection hole is used to allow the electrolyte to pass through during liquid injection. Before the liquid injection, the liquid injection hole is in the open state. During the liquid injection, the electrolyte flows through the liquid injection hole from one accommodation cavity to another accommodation cavity, to inject the electrolyte into all accommodation cavities inside the housing with fewer times of injection. After the liquid injection, the block mechanism closes the liquid injection hole, so that the liquid injection hole is in the closed state, and electrolytes in two adjacent accommodation cavities are isolated from each other, and accommodated only in the respective accommodation cavities.

In some other embodiments, the liquid injection hole has a function of allowing the electrolyte to pass through, and a function of air discharge in an abnormal condition. Before liquid injection, the liquid injection hole is in the open state. During the liquid injection, the electrolyte flows through the liquid injection hole from one accommodation cavity to another accommodation cavity, to inject the electrolyte into all accommodation cavities inside the housing with fewer times of injection. After the liquid injection, the block mechanism closes the liquid injection hole, so that the liquid injection hole is in the closed state, and electrolytes in two adjacent accommodation cavities are isolated from each other. In addition, when the lithium-ion battery is normally used, the block mechanism closes the liquid injection hole, so that two adjacent accommodation cavities are isolated from each other; when the lithium-ion battery is overcharged or short circuited (in other words, when internal pressure of an accommodation cavity inside the lithium-ion battery reaches a specified value), the block mechanism opens the liquid injection hole, so that the liquid injection hole turns to the open state, air in the accommodation cavity with excessive internal pressure can be discharged to another accommodation cavity or to outside of the lithium-ion battery through the liquid injection hole. In some embodiments, the block mechanism is of a sheet structure provided with a nick, and the nick can be broken under an action of pressure, to enable the block mechanism to open the liquid injection hole. The nick enables the block mechanism of the sheet structure to react more sensitively to pressure, and improves precision of the block mechanism in opening the liquid injection hole for the accommodation cavity with excessive pressure.

In the present invention, a plurality of separators separate the housing into a plurality of accommodation cavities, and each accommodation cavity can accommodate one battery core set or a plurality of battery core sets connected in parallel or in series; and one or more of the separators separating the housing into the plurality of accommodation cavities are provided with a liquid injection hole, or each of the separators is provided with a liquid injection hole. In some embodiments, a cover plate with a liquid injection channel is disposed at one end in a length direction, and the electrolyte is injected into all the accommodation cavities in the housing through the liquid injection channel; in this embodiment, each separator is provided with a liquid injection hole, so that the electrolyte is injected into all the accommodation cavities through injection once. In some other embodiments, a cover plate with a liquid injection channel is disposed at each of two ends in a length direction, and the electrolyte is injected into all the accommodation cavities in the housing through the liquid injection channels at the two ends; in this embodiment, because two liquid injection channels are provided, at least one separator in the middle may not be provided with a liquid injection hole, or in other words, the two liquid injection channels can be used to correspondingly inject the electrolyte into two completely isolated cavities, and although the separator in the middle does not have a liquid injection hole, the electrolyte can be injected into all the accommodation cavities through the two liquid injection channels.

In an embodiment of the present invention, when the block mechanism is in a first situation, the liquid injection hole is in the open state; when the block mechanism is in a second situation, the liquid injection hole is in the closed state.

It should be noted that, in the present invention, the first situation and the second situation of the block mechanism may be two structure states of the block mechanism, or refer to that the block mechanisms are located at two different positions in the housing. For example, in some embodiments, in the first situation, the block mechanism is located at a first position; in the second situation, the block mechanism is located at a second position. In some other embodiments, in the first situation, the block mechanism is of a net structure, and in this situation, the liquid injection hole is in the open state; in the second situation, under a high temperature or high pressure, the block mechanism of the net structure is hot-melted, and mesh holes of the block mechanism of the net structure are all closed due to hot melting, and in this situation, the block mechanism closes the liquid injection hole, so that the liquid injection hole is in the closed state.

In the present invention, the open state means that the liquid injection hole can connect two adjacent accommodation cavities, so that a liquid can flow between the two adjacent accommodation cavities; and the closed state means that the two adjacent accommodation cavities are isolated by the block mechanism, so that the liquid cannot flow between the two adjacent accommodation cavities through the liquid injection hole. It should be noted that, when the liquid injection hole is used to allow the electrolyte to flow (liquid injection), the closed state may be a completely closed state, or may be a state in which the liquid (the electrolyte) hardly flows, which is switched from the open state in which the liquid easily flows; the state in which the liquid hardly flows means that under a working condition, the liquid (the electrolyte) hardly flows through the liquid injection hole, but air may flow slightly.

In some embodiments of the present invention, before or during liquid injection of the lithium-ion battery, the block mechanism is in the first situation, the liquid injection hole is in the open state, and the two adjacent accommodation cavities on the two sides of the separator are connected through the liquid injection hole; and after the liquid injection of the lithium-ion battery, the block mechanism switches from the first situation to the second situation, the block mechanism is in the second situation, and the block mechanism closes the liquid injection hole, so that the liquid injection hole is in the closed state.

In this embodiment, after the liquid injection, in order that the electrolyte does not flow among different accommodation cavities when the lithium-ion battery is used, the block mechanism closes the liquid injection hole, so that the liquid injection hole is in the closed state.

In some other embodiments of the present invention, when the lithium-ion battery is formed after the liquid injection, the block mechanism is in the first situation, the liquid injection hole is in the open state, and the two adjacent accommodation cavities on the two sides of the separator are connected through the liquid injection hole; and after the lithium-ion battery is formed after the liquid injection, the block mechanism switches from the first situation to the second situation, and the block mechanism closes the liquid injection hole, so that the liquid injection hole is in the closed state.

In some other embodiments of the present invention, when the block mechanism is in the second situation, the liquid injection hole is in the closed state; when the block mechanism is in the first situation, the block mechanism enables the liquid injection hole to be in the open state; and the block mechanism switches from the second situation to the first situation.

For example, in some embodiments, when the lithium-ion battery is normally used, the block mechanism is in the second situation, and the liquid injection hole is in the closed state; when the lithium-ion battery is overcharged or short-circuited, the block mechanism switches from the second situation to the first situation, the block mechanism enables the liquid injection hole to be in the open state, and the two adjacent accommodation cavities on the two sides of the separator are connected through the liquid injection hole.

In some embodiments of the present invention, when the block mechanism is in the first situation, the block mechanism enables the liquid injection hole to be in the open state; when the block mechanism is in the second situation, the block mechanism enables the liquid injection hole to be in the closed state; and the block mechanism is capable of switching between the first situation and the second situation.

For example, in some embodiments, before or during liquid injection of the lithium-ion battery, the block mechanism is in the first situation, the liquid injection hole is in the open state; after the liquid injection of the lithium-ion battery, the block mechanism switches from the first situation to the second situation, and the block mechanism closes the liquid injection hole, so that the liquid injection hole is in the closed state; when the lithium-ion battery is overcharged or short-circuited, the block mechanism switches from the second situation to the first situation, and the block mechanism enables the liquid injection hole to be in the open state.

In the present invention, if only to meet liquid injection and sealing requirements are met, the block mechanism is required only to be capable of switching from the first situation to the second situation. If to improve performance of the lithium-ion battery comprehensively while meeting requirements of liquid injection and sealing as well as air discharge, the block mechanism may be designed to be capable of switching between the first situation and the second situation. To be specific, the block mechanism switches from the first situation to the second situation during the liquid injection (opening) and after the liquid injection (sealing); and when the lithium-ion battery changes from a normal operating state to an overcharged or short-circuited state, the block mechanism needs to change from a sealing state to an opening state, that is, to switch from the second situation to the first situation.

In the present invention, the external force is selected from one or more of gravity, electromagnetic force, inertia force, or thermal force. In some embodiments of the present invention, the block mechanism switches from the first position to the second position under a single or combined action of the gravity, the electromagnetic force, or the inertia force. In some other embodiments, the block mechanism closes the liquid injection hole in a hot melting manner under an action of the thermal force.

In some embodiments of the present invention, first, liquid injection hole is used to allow the electrolyte to pass through; second, in special cases, the liquid injection hole can be opened as an explosion-proof air discharge channel.

In some embodiments, in a case of liquid injection, the block mechanism is a liquid injection hole sealing part disposed inside the liquid injection hole. In some other embodiments, the block mechanism is selected to be of a thin sheet structure with a nick on its surface, in a normal state, the block mechanism of the thin sheet structure closes the liquid injection hole (liquid injection hole), and in an overcharged or short-circuited state, due to an increase in atmospheric pressure, the surface of the block mechanism is cracked due to the nick, so that the liquid injection hole is in the open state for air circulation.

Figure 2:
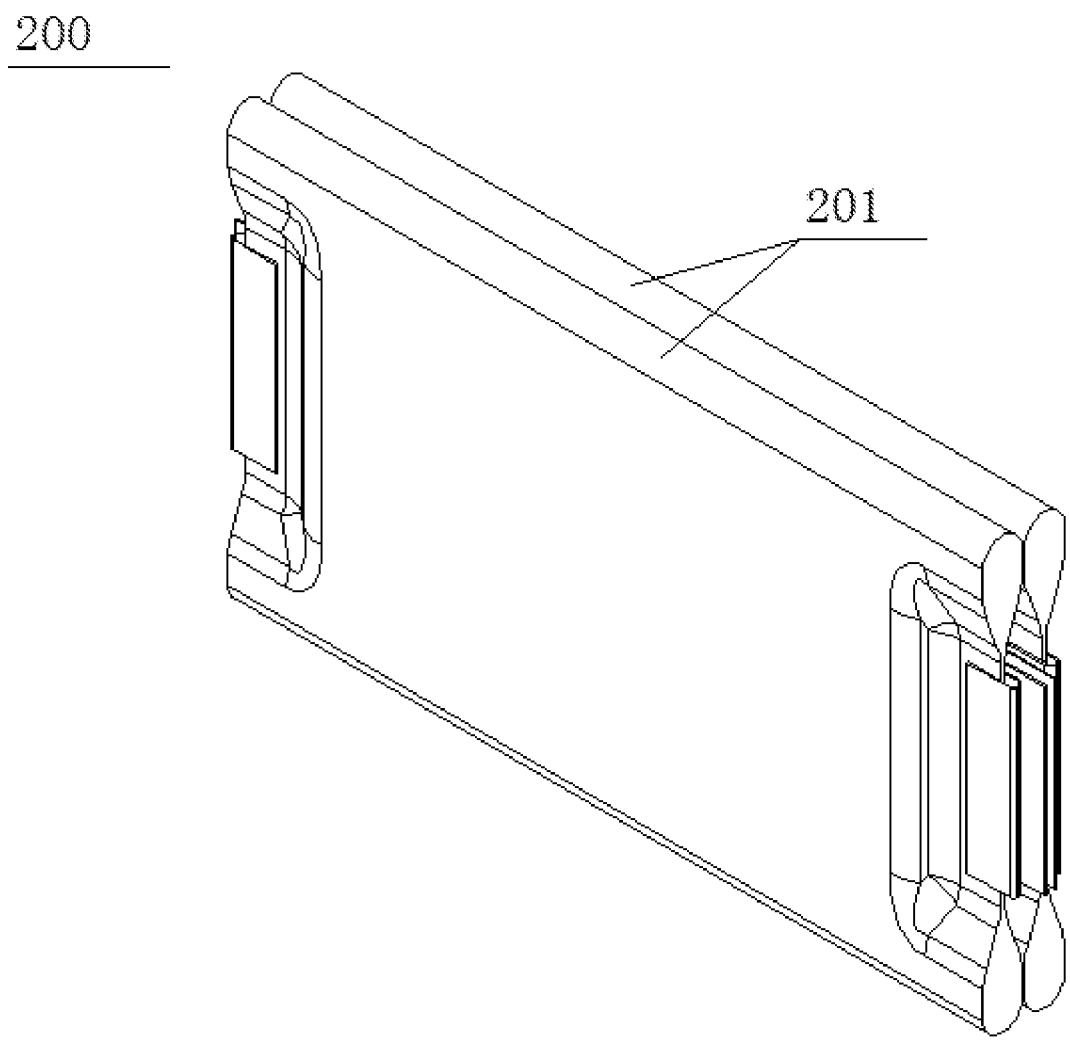
FIG. 2 is a schematic structural diagram of a battery core set according to an embodiment of the present invention.
Figure 10:
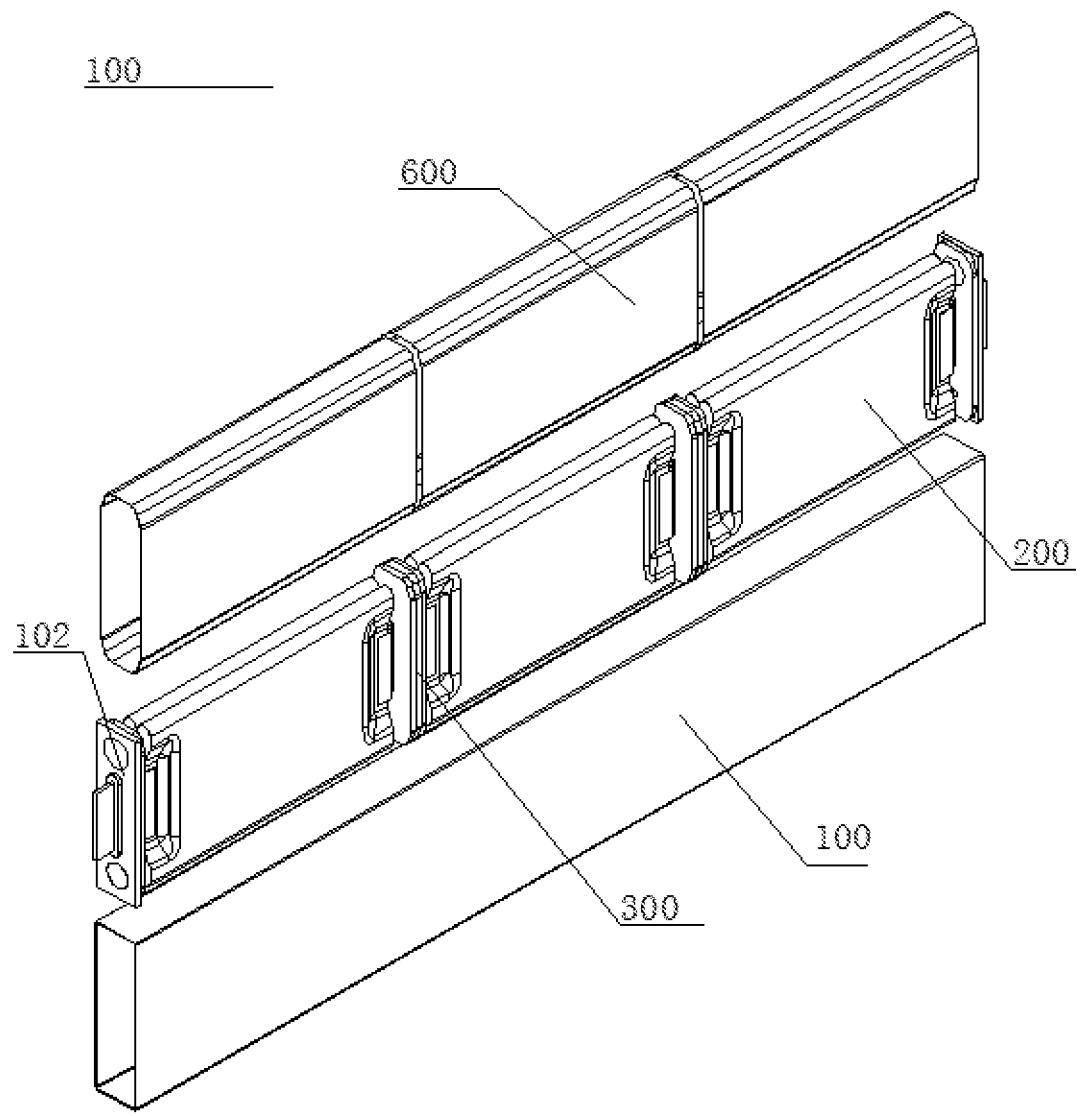
FIG. 10 is an exploded view of an assembly method of a housing and a battery core set according to an embodiment of the present invention.

The present invention provides a lithium-ion battery 10. As shown in FIG. 1, FIG. 2, and FIG. 10, the lithium-ion battery 10 includes a housing 100, and battery core sets 200. The battery core sets 200 are located inside the housing 100, the battery core sets 200 each include at least one battery core 201, and the battery core sets 200 are connected in series. As shown in FIG. 1 and FIG. 10, three battery core sets 200 are accommodated inside the housing 100 of the lithium-ion battery 10, and the three battery core sets 200 are arranged along a length direction of the lithium-ion battery 10 and connected in series. A left-right direction in FIG. 1 is a first direction, which is the length direction of the lithium-ion battery 10. Certainly, in some other embodiments, a quantity of the battery core sets 200 may be two, four, or more.

As shown in FIG. 1, a separator 300 is located inside the housing 100, the separator 300 is located between the battery core sets 200, the separator 300 separates internal space of the housing 100 into a plurality of accommodation cavities 400, the separator 300 is provided with a liquid injection hole 301, and the liquid injection hole 301 is used to connect two adjacent accommodation cavities 400. In an embodiment of the present invention, as shown in FIG. 1, two separators 300 are disposed inside the housing 100, the two separators 300 separate the internal space of the housing 100 into three accommodation cavities 400, each accommodation cavity 400 is provided with one battery core set 200, and the battery core sets 200 are successively connected in series. In other embodiments of the present invention, a quantity of the separators 300 is one or more than two, and each accommodation cavity 400 may accommodate only one battery core set 200 as shown in FIG. 1, or one accommodation cavity 400 accommodates a plurality of, for example, two or three, battery core sets 200 arranged side by side. In the present invention, one battery core set 200 is ideally accommodated in one accommodation cavity 400, which can achieve an optimal isolation effect.

Figure 5:
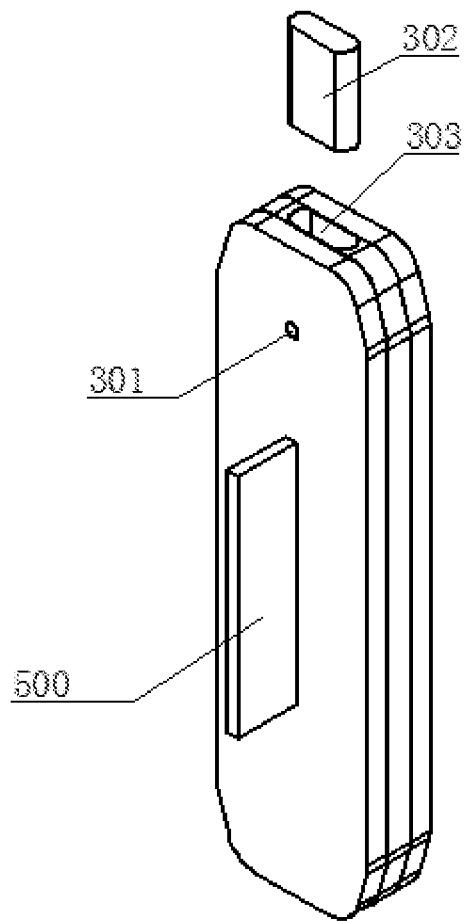
FIG. 5 is a structural exploded view of a separator according to an embodiment of the present invention.
Figure 6:
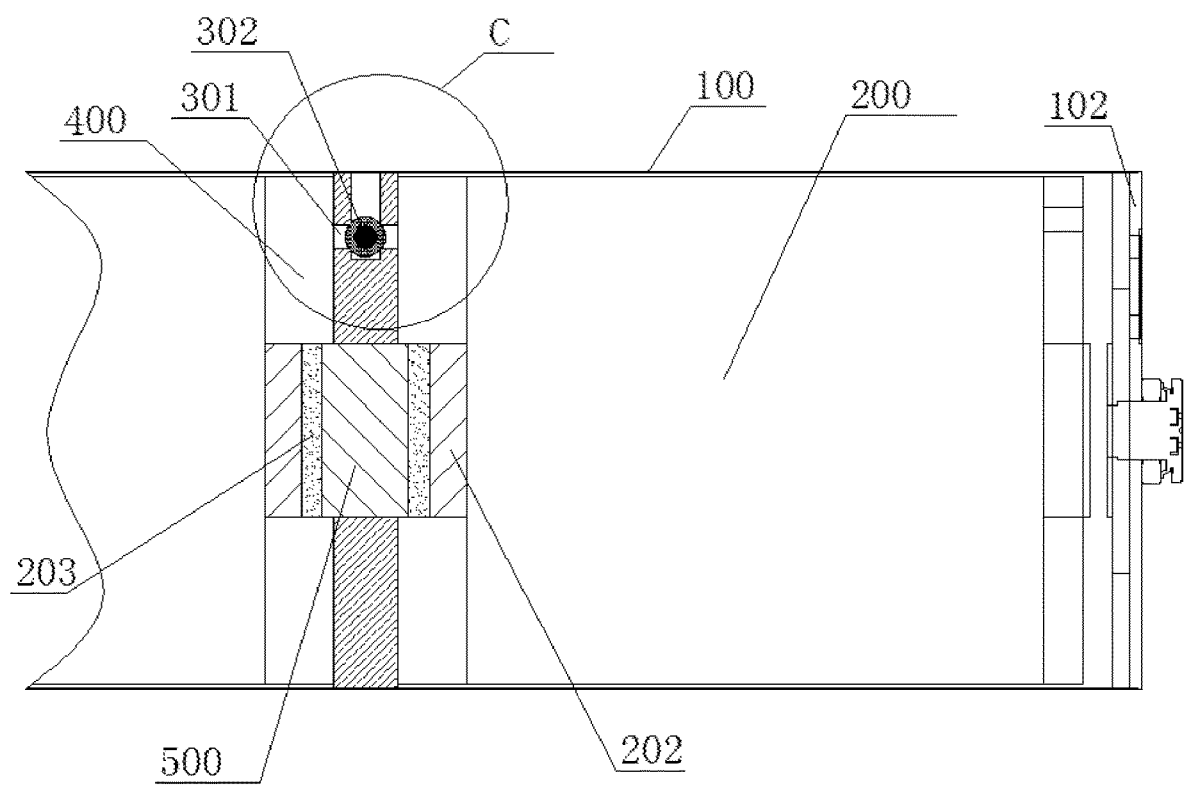
FIG. 6 is a schematic structural partial cross-sectional view of a lithium-ion battery according to another embodiment of the present invention.
Figure 7:
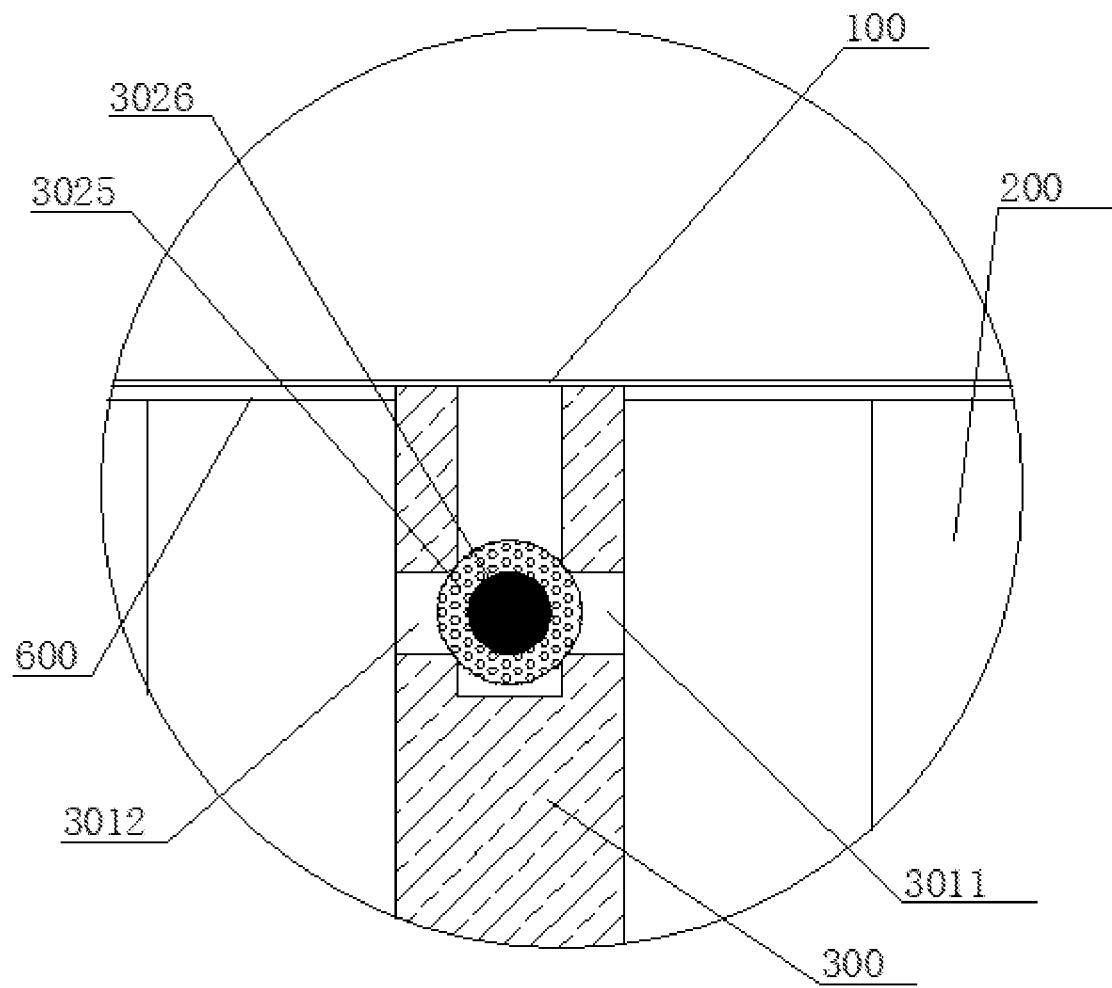
FIG. 7 is a partially enlarged view of a part C of FIG. 6.

As shown in FIG. 5, FIG. 6, and FIG. 7, the lithium-ion battery 10 provided in the present invention further includes a block mechanism 302. The block mechanism 302 is located inside the housing 100, the block mechanism 302 enables the liquid injection hole 301 to be in a specified state, and the specified state includes an open state and a closed state.

When the block mechanism 302 is in a second situation, the liquid injection hole 301 is closed. A state after liquid injection of the lithium-ion battery 10 is shown in FIG. 6. In this case, the block mechanism 302 is in the second situation, the state is the same as a normal operating state of the lithium-ion battery 10, and in this state, the block mechanism 302 closes the liquid injection hole 301.

In some embodiments of the present invention, the block mechanism 302 may completely close the liquid injection hole 301, or may partially close the liquid injection hole 301, as long as electrolyte isolation between adjacent accommodation cavities 400 can be achieved. Under a general working condition of the lithium-ion battery 10, although the accommodation cavities 400 are not completely closed and isolated from each other, because the liquid injection hole 301 has a certain height, it is not easy for the electrolyte to flow from one to another in a use process. Certainly, for the sake of safety and to achieve an optimal effect, the block mechanism 302 preferably completely closes the liquid injection hole 301.

In an embodiment of the present invention, before the liquid injection of the lithium ion battery, the two adjacent accommodation cavities on the two sides of the separator are connected through the liquid injection hole. In this way, when one of the accommodation cavities is vacuumized, air in the adjacent other accommodation cavity can flow through the liquid injection hole to the accommodation cavity. Thus, it is not necessary to vacuumize each accommodation cavity, which helps improve working efficiency and reduces costs.

Figure 8:
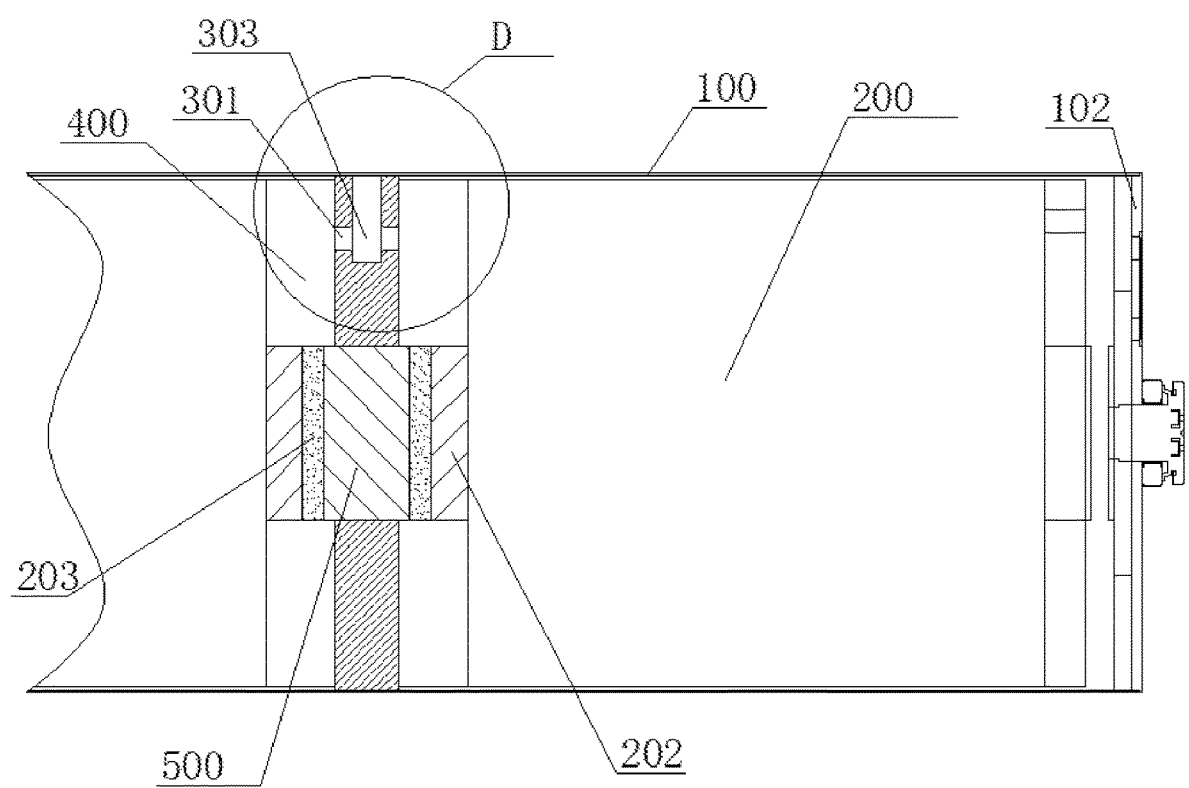
FIG. 8 is a schematic structural partial cross-sectional view of the lithium-ion battery of FIG. 6 after a block mechanism is removed.
Figure 9:
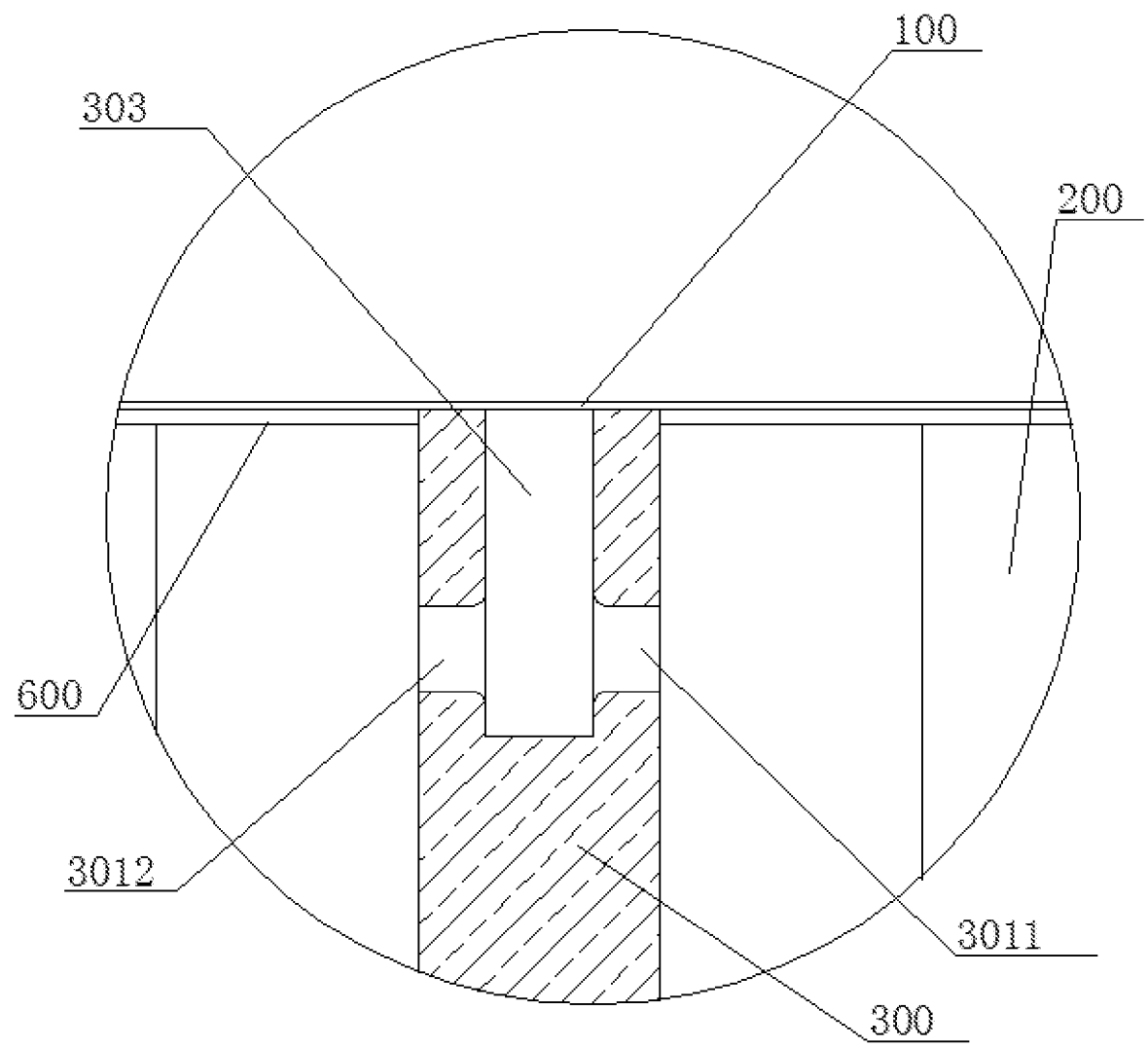
FIG. 9 is a partially enlarged view of a part D of FIG. 8.

In an embodiment of the present invention, during the liquid injection of the lithium-ion battery 10, two adjacent accommodation cavities 400 are connected through the liquid injection hole 301 as shown in FIG. 8 and FIG. 9; after the liquid injection of the lithium-ion battery 10 or in a normal operating state, the block mechanism 302 closes the liquid injection hole 301 as shown in FIG. 6 and FIG. 7.

In some other embodiments, when the lithium-ion battery 10 is overcharged or short-circuited, in this case, air inside the lithium-ion battery 10 needs to be discharged as soon as possible, and one way is to connect the accommodation cavities 400, so that the air inside is discharged out of the housing 100 as soon as possible. Therefore, when the lithium-ion battery 10 is in an overcharged or short-circuited state, the block mechanism 302 is in the first situation, the block mechanism 302 opens the liquid injection hole 301, and two adjacent accommodation cavities 400 are connected through the liquid injection hole 301.

In an embodiment of the present invention, as shown in FIG. 6 and FIG. 7, after the liquid injection or in a normal operating state of the lithium-ion battery 10, the block mechanism 302 is in the second situation, and the block mechanism 302 closes the liquid injection hole 301, to block connection between the two adjacent accommodation cavities 400 through the liquid injection hole 301. Therefore, the two adjacent accommodation cavities 400 are completely isolated.

In the present invention, the mentioned battery core 201 is a battery core 201 commonly used in the field of power batteries, the battery core 201 and the battery core set 200 are internal components of the housing 100 of the lithium-ion battery 10, and cannot be understood as the lithium-ion battery 10 itself, where the lithium-ion battery 10 is a single battery. The battery core 201 may be formed by winding or laminating. Generally, the battery core 201 includes at least a positive electrode plate, an isolating film, and a negative electrode plate. It should be noted that, the lithium-ion battery 10 mentioned in the present invention is an independent single battery, which cannot be simply understood as a battery module or a battery pack because the lithium-ion battery 10 includes a plurality of pole shanks 201.

In the present invention, the battery core set 200 may include a single battery core set 200 or at least two pole shanks 201 connected in parallel. As shown in FIG. 2, the battery core set 200 is formed after two pole shanks 201 are connected in parallel; or the battery core set 200 is formed after four pole shanks 201 are connected in parallel.

At least one separator 300 is disposed inside the housing 100, a quantity of separators 300 may be one, two, three, or even more, and is generally preferably two or more.

In the present invention, when the lithium-ion battery 10 is excessively long, the electrolyte inside will decompose due to a high voltage difference and affect performance of the battery 10, and to eliminate this problem, a separator 300 is disposed between two adjacent accommodation cavities 400. Preferably, for better insulation and isolation, the separator 300 may be made of an insulative material. In other words, the separator 300 is an insulating separator 300. Thus, no further operation is required, and the insulation and isolation between the two accommodation cavities 400 can be achieved directly by the separator 300.

The separator 300 separates the internal space of the housing 100 into at least two accommodation cavities 400, and the battery core sets 200 are accommodated inside the accommodation cavities 400. Generally, as shown in FIG. 1, one accommodation cavity 400 accommodates one battery core set 200. At least two battery core sets 200 are connected in series. Generally, a quantity of the battery core sets 200 connected in series is determined based on requirements on an output voltage of each battery core set 200, a height of the battery pack, and an overall voltage of the battery pack. For example, an automobile requires a battery system to output a voltage of 300 V. A lithium-ion battery 10 has a voltage of 3.2 V. In the prior art, 100 lithium-ion batteries 10 need to be connected in series in a pack to meet the requirement. However, in a battery pack provided in the present invention, if two battery core sets 200 are connected in series inside the battery 10, only 50 batteries 10 need to be arranged. This greatly simplifies design of the whole pack and arrangement of the batteries 10, and can effectively utilize space to improve space utilization.

Certainly, one accommodation cavity 400 may accommodate a plurality of battery core sets, and battery core sets in each accommodation cavity are connected in parallel. For example, a quantity of battery core sets in one accommodation cavity is two or three, and the two or three battery core sets are connected in parallel. It should be understood that, quantities of battery core sets accommodated in accommodation cavities may be the same or different based on actual use needs.

At least two battery core sets 200 are connected in series.

It should be noted that, battery core sets in two adjacent accommodation cavities may be connected in series directly or indirectly, for example, connected in series by using middleware.

Figure 3:
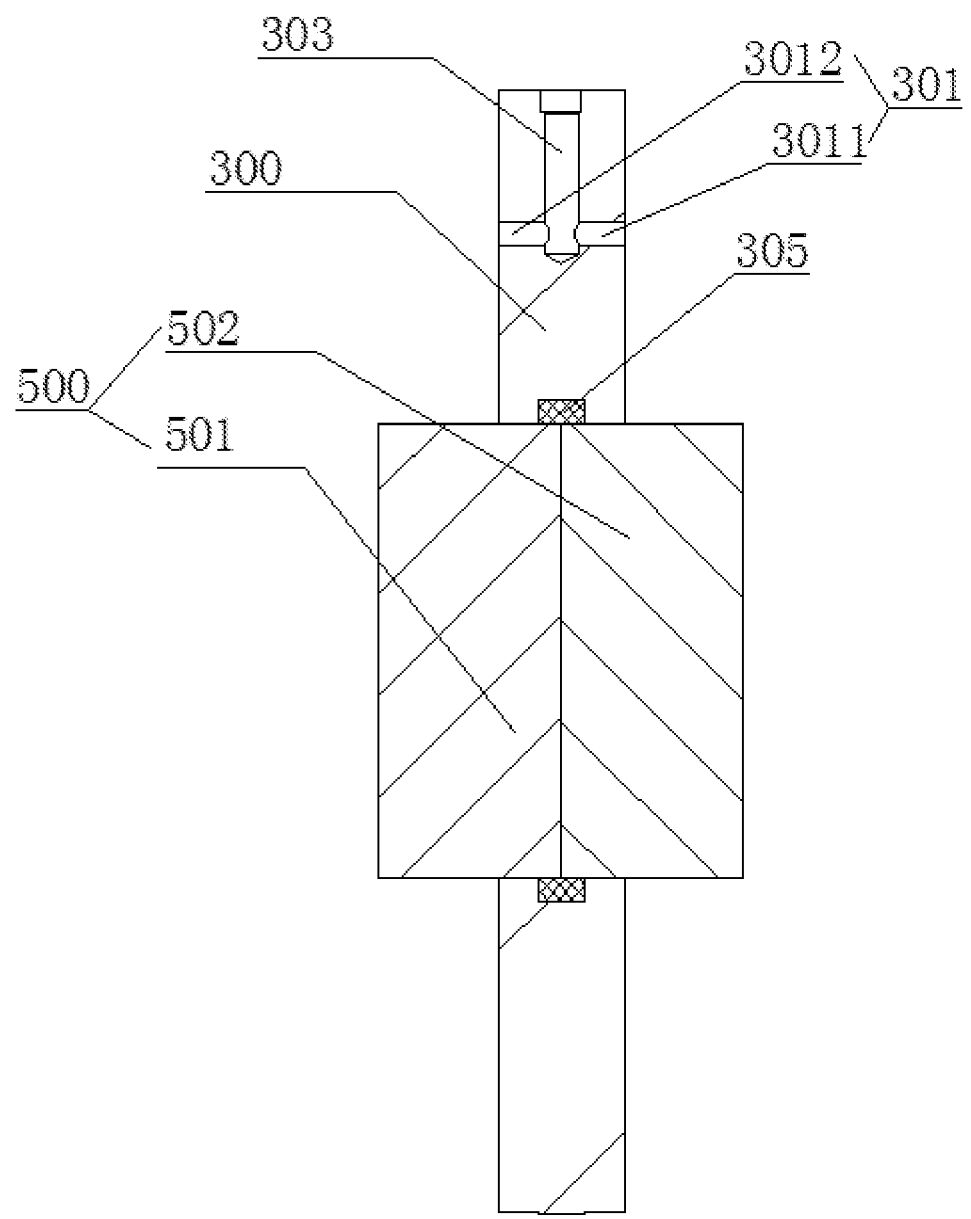
FIG. 3 is a schematic structural diagram of a separator with a sealing ring according to an embodiment of the present invention.
Figure 4:
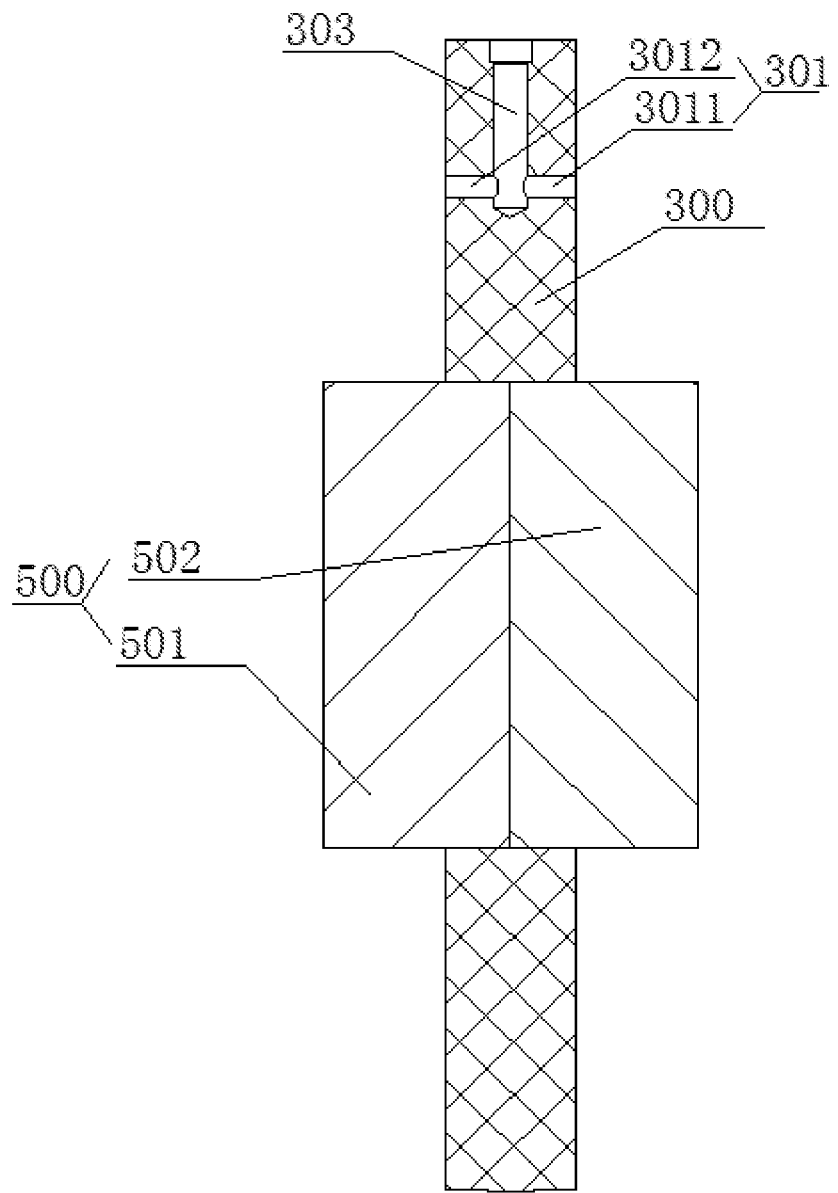
FIG. 4 is a schematic diagram of an integral injection molding structure of a separator and a battery core connection strap according to an embodiment of the present invention.

In an embodiment of the present invention, as shown in FIG. 3 and FIG. 4, the lithium-ion battery includes a battery core connector 500, and two adjacent battery core sets 200 are connected in series by using the battery core connector 500. In the present invention, as the two adjacent battery core sets 200 are located inside the same housing 100, a spacing between the two battery core sets 200 is greatly reduced. Compared with connecting two lithium-ion batteries 10 by a power connector, this simplifies an assembly process of the following battery pack, and reduces used materials and the weight. In addition, as the two battery core sets 200 are disposed in the same housing 100, stability and robustness requirements on the battery core connector 500 are greatly lowered. As there is no need to consider the connection reliability, the battery core connector 500 can be given larger design space, thereby increasing a flow area and reducing internal resistance of the battery 10.

For the battery core connector 500, an embodiment of the present invention discloses a connection and position relationship between the battery core connector 500 and the separator 300. As shown in FIG. 3, the separator 300 is provided with a connecting liquid injection hole 301, the battery core connector 500 is threaded through the connecting liquid injection hole 301 from one side of the connecting liquid injection hole 301 to the other side. To be specific, the battery core connector 500 passes through the connecting liquid injection hole 301, one end of the battery core connector 500 is connected to a battery core set 200 on one side of the separator 300, and the other end of the battery core connector 500 is connected to a battery core set 200 on the other side of the separator 300. To isolate the accommodation cavities 400 on the two sides of the separator 300, a package structure 305 is disposed in the connecting liquid injection hole 301, the package structure 305 packages the battery core connector 500 in the connecting liquid injection hole 301, and the package structure 305 can close the connecting liquid injection hole 301 to isolate the adjacent accommodation cavities 400 on the two sides of the separator 300.

The above is a specific installation solution of the battery core connector 500 according to an embodiment of the present invention. However, in the solution, the connecting liquid injection hole 301 needs to be packaged twice, which is very inconvenient. In addition, for packaging twice, a complex material is selected for the package structure 305, which may affect the electrolyte inside the battery 10. In view of this, as shown in FIG. 4, another embodiment of the present invention provides a solution for integrally forming the battery core connector 500 and the separator 300. In the solution, the battery core connector 500 and the separator 300 are integrally formed. Specifically, the battery core connector 500 is first made, and then the separator 300 is formed outside the battery core connector 500 through injection molding. During assembly, the battery core set 200 is directly connected to the battery core connector 500, and no liquid injection hole 301 needs to be packaged, which simplifies the process and reduces the risk.

In a specific embodiment of the present invention, as shown in FIG. 3 and FIG. 4, the battery core connector 500 includes a copper connection portion 501 and an aluminum connection portion 502. The copper connection portion 501 and the aluminum connection portion 502 are electrically connected inside the separator 300. In this embodiment, the copper connection portion 501 is connected to a copper pigtail of the battery core set 200 on one side of the separator 300, and the aluminum connection portion 502 is connected to an aluminum pigtail of the battery core set 200 on the other side of the separator 300.

More specifically, first, the copper connection portion 501 and the aluminum connection portion 502 are combined to form a composite connection portion; then the separator 300 is formed through injection molding with the composite connection portion. In this way, the position (the composite connection portion) where the copper connection portion 501 is in contact with the aluminum connection portion 502 is sealed inside the separator 300, to prevent exposure to the internal space of the battery 10, especially to prevent contact with the electrolyte, thereby avoiding corrosion of the copper-aluminum junction.

The separator 300 is provided with a liquid injection hole 301, and the liquid injection hole 301 is used to connect two adjacent accommodation cavities 400. When a quantity of the separators 300 is greater than or equal to 2, liquid injection holes 301 provided on the separators 300 can connect a plurality of accommodation cavities 400, to inject the electrolyte into the accommodation cavities 400 once.

In an embodiment of the present invention, the copper connection portion 501 and the aluminum connection portion 502 of the battery core set 200 are disposed along a first direction on two opposite sides of the battery core set 200, all battery core sets in the housing are arranged along the first direction, and the first direction is a length direction of the lithium-ion battery. That is, the battery core sets are arranged in a head to head manner. This arrangement manner facilitates serial connection between the battery core sets, and a connection manner, processing, and an assembly process are relatively simple.

In an embodiment of the present invention, the battery 10 includes a block mechanism 302, the block mechanism 302 is at least partially located inside the liquid injection hole 301, and the block mechanism 302 closes the liquid injection hole 301, to block connection between the two adjacent accommodation cavities 400 through the liquid injection hole 301. In this embodiment, the block mechanism 302 is disposed on the separator 300.

In the present invention, the separator 300 is provided with a liquid injection hole 301, the liquid injection hole 301 is used to connect two adjacent accommodation cavities 400, and during liquid injection, the accommodation cavities 400 are connected through the liquid injection hole 301. Therefore, even when the electrolyte is injected into one accommodation cavity 400, the electrolyte can flow through the liquid injection hole 301 to another accommodation cavity 400, so that the electrolyte is injected into each accommodation cavity 400 well. In addition, the separator 300 is provided with a block mechanism 302, and the block mechanism 302 is at least partially located inside the liquid injection hole 301 and closes the liquid injection hole 301, to block connection between the two adjacent accommodation cavities 400 through the liquid injection hole 301. That is, after the liquid injection is completed, the block mechanism 302 closes the liquid injection hole 301, so that the two adjacent accommodation cavities 400 are isolated from each other, and the electrolyte does not flow between the two adjacent accommodation cavities 400 to avoid mutual impact, or decompose due to a high voltage difference, thereby ensuring safety and service life of the battery 10.

In an embodiment of the present invention, as shown in FIG. 10, the housing 100 is a metal housing 100, for example, an aluminum housing. Certainly, other metals may alternatively be selected based on needs. In this embodiment, since the battery 10 includes a plurality of battery core sets 200 connected in series, the housing 100 has different voltages outside accommodation cavities 400 in which different battery core sets 200 are located. In some cases, the aluminum housing may have an excessively low potential at some positions, resulting in that lithium ions are embedded in the aluminum housing, form a lithium aluminum alloy, and affect service life of the battery 10. Based on this, in an embodiment of the present invention, the battery 10 further includes an isolating film 600. The isolating film 600 is located between the battery core set 200 and the housing 100, and the accommodation cavity 400 is located inside the isolating film 600. Specifically, the isolating film 600 and the separator form the accommodation cavities 400, and the isolating film 600 is used to isolate lithium ions in the electrolyte from the housing 100. This can effectively prevent contact between the housing 100 and the lithium ions, reduce the possibility of a lithium aluminum reaction, and improve safety and use reliability of the battery 10. In addition, the isolating film 600 may further perform an insulation function.

The isolating film is insulative and corrosion resistant to the electrolyte, and a material of the ion isolating film is not particularly limited, as long as the isolating film can be insulative and does not react with the electrolyte. In some embodiments, the material of the ion isolating film includes polypropylene (PP), polyethylene (PE), or a multilayer composite film. For example, the isolating film includes an inner layer, an outer layer, and an intermediate layer located between the inner layer and outer layer. The inner layer includes a plastic material. For example, the inner layer may be made of an insulative material less reactive to the electrolyte. The intermediate layer includes a metal material, which can prevent vapor outside from entering the battery and prevent the electrolyte inside from leaking out of the battery. Aluminum foil, stainless steel foil, copper foil, and the like are preferably selected as a metal layer, and considering the molding performance, weight, and costs, the aluminum foil is the optimal. For an aluminum foil material, priority is given to pure aluminum or aluminum-iron-based alloy materials. The outer layer is a protective layer, and is mostly made of a high melting point polyester or nylon material that has strong mechanical performance and prevents an external force from damaging the battery to protect the battery, which is, for example, an aluminum-plastic composite film.

In another embodiment of the present invention, the battery further includes an isolating bag, the battery core sets are located inside the isolating bag, and the separator separates internal space of the isolating bag into a plurality of accommodation cavities. The isolating bag can perform an insulation function to prevent contact between the housing and lithium ions in the electrolyte, thereby improving the service life of the battery.

As is known to all, safety and stability are important for the power battery. In a framework of a traditional battery module and battery pack, a plurality of independent lithium-ion batteries 10 are connected in series/parallel to form the battery module or the battery pack; in this case, each lithium-ion battery 10 may be sampled, and as each lithium-ion battery 10 is independent, it is convenient to dispose and route a sample line. However, in the present invention, since a plurality of battery core sets 200 are located inside the housing 100, to monitor a status of each battery core set 200, the sample line is disposed inside the housing 100 for sampling.

In an embodiment of the present invention, as shown in FIG. 1, the housing 100 includes a housing body 100 with an opening on an end portion and a cover plate 102 disposed at the opening of the housing body 100, the opening is located on the end portion of the housing 100 along a first direction (a left-right direction in the figure), and an upper side and a lower side are side walls of the housing 100. In a general design, a liquid injection hole is disposed on the cover plate 102. In this embodiment, due to presence of the separator 300, if the liquid injection hole is disposed only at one end or two ends of the cover plate 102 in the first direction, when a quantity of separators 300 is greater than or equal to 2, the electrolyte cannot be injected into an accommodation cavity 400 in the middle. Therefore, in the present invention, the separator 300 is provided with a liquid injection hole 301, so that the electrolyte can be injected into each accommodation cavity 400 by simply injecting the electrolyte from the cover plate 102 on the end portion of the battery 10. In this solution, the electrolyte can be injected into each accommodation cavity 400 through injection once rather than opening and liquid injection a plurality of times. As shown in FIG. 1, in an embodiment of the present invention, the first direction (the left-right direction) is a length direction of the battery 10, and an arrangement direction (a series connection direction) of the battery core sets 200 inside the battery 10.

In another embodiment, when a quantity of the liquid injection holes is two, one of the plurality of separators may not be provided with a liquid injection hole. For example, two ends of the housing along the first direction are each provided with the cover plate, and each cover plate is provided with a liquid injection channel. The separator without a liquid injection hole is referred to as a first separator. The other separators with a liquid injection hole are referred to as second separators. A liquid injection channel of a cover plate located on a first side of the first separator is used to inject the electrolyte into an accommodation cavity located on the first side, a liquid injection channel of a cover plate located on a second side of the first separator is used to inject the electrolyte into an accommodation cavity located on the second side, and a liquid injection hole of the second separator is used to connect accommodation cavities located on two sides of the second separator. Certainly, the liquid injection channel may alternatively be disposed on the housing based on an actual requirement.

In the field of power batteries, consistency of working conditions of lithium-ion batteries 10 is very important, which directly affects performance of an entire battery pack. Similarly, in the present invention, consistency of working conditions of the battery core sets 200 inside the battery 10 also affects overall performance of each battery 10, and affects performance of an entire battery pack. In addition, the volume of the electrolyte inside the battery 10 affects the performance of the battery 10, such as a capacity and activity. Therefore, in the present invention, at least two separators 300 separate the internal space of the housing 100 into at least three accommodation cavities 400, the liquid injection hole 301 on each separator 300 is a cylindrical hole through the separator 300 in the first direction, and liquid injection holes 301 of all the separator 300 are coaxially arranged. In this way, by using a central axis of the liquid injection hole 301 as a reference line, a liquid level of the electrolyte in the accommodation cavities 400 can be well controlled. Thus, consistency of electrolyte volumes in the accommodation cavities 400 can be well controlled to ensure consistency of the battery core sets 200.

In addition, more preferably, the liquid injection holes 301 may be coaxially arranged with a same inner diameter, making it easier and more precise to control the consistency of the electrolyte volume. Moreover, whether liquid levels of the electrolyte are consistent can be determined below the central axis. The overall consistency is improved and the difficulty of consistency determining is reduced, so that the operability is improved and the performance of the battery 10 is ensured.

To facilitate the liquid injection and better observe and control the liquid level, in an embodiment of the present invention, a first liquid injection hole 3011 and a second liquid injection hole 3012 are both cylindrical holes, and are coaxially arranged. In this embodiment, at least when the liquid level of the electrolyte rises to a circumferential contour of the first liquid injection hole 3011 and the second liquid injection hole 3012, it may be determined that liquid levels of the electrolyte in the plurality of accommodation cavities 400 are equal. This ensures consistency of liquid injection volumes, and ensures the consistency of the battery 10.

In another embodiment of the present invention, the first liquid injection hole 3011 and the second liquid injection hole 3012 are both cylindrical holes, and have a same inner diameter. This ensures an injection rate.

As shown in FIG. 3 to FIG. 10, in an embodiment of the present invention, the separator 300 is provided with a block mechanism placement space 303, a first position and a second position are formed in the block mechanism placement space 303 for accommodating the block mechanism 302, and the block mechanism 302 is capable of moving from the first position to the second position under an action of an external force. Before the liquid injection, or during liquid injection, or before the lithium-ion battery 10 is formed after the liquid injection, or when the lithium-ion battery 10 is overcharged/short-circuited, the block mechanism 302 is located at the first position. To be specific, the block mechanism 302 is in the first situation, and two adjacent accommodation cavities 400 are connected through the liquid injection hole 301. After the liquid injection, or when the lithium-ion battery 10 is in a normal operating state, or after the lithium-ion battery 10 is formed after the liquid injection, the block mechanism 302 is at the second position. To be specific, the block mechanism 302 is in the second situation, and the block mechanism 302 closes the liquid injection hole 301, to block connection between the two adjacent accommodation cavities 400 through the liquid injection hole 301.

As shown in FIG. 8 or FIG. 9, the block mechanism placement space 303 is connected with the liquid injection hole 301.

In the foregoing embodiments, the block mechanism placement space 303 is a space disposed inside the separator 300, that is, the block mechanism placement space 303 has no opening in a circumferential direction of the separator 300; and the block mechanism 302 is disposed inside the block mechanism placement space 303. Before the liquid injection, the block mechanism 302 is located at the first position inside the block mechanism placement space 303. In this case, the block mechanism 302 does not close the liquid injection hole 301. After the liquid injection, an external force is exerted to the block mechanism 302, so that the block mechanism 302 is moved from the first position to the second position inside the block mechanism placement space 303, and closes the liquid injection hole 301 to block connection between the two adjacent accommodation cavities 400 through the liquid injection hole 301.

In an embodiment of the present invention, as shown in FIG. 8, the block mechanism placement space 303 and the liquid injection hole 301 are cross-arranged, the liquid injection hole 301 is separated by the block mechanism placement space 303 into a first liquid injection hole 3011 and a second liquid injection hole 3012, and the first liquid injection hole 3011 and the second liquid injection hole 3012 are both connected with a closed space of the block mechanism placement space 303 to connect two adjacent accommodation cavities 400.

In another embodiment, the first liquid injection hole 3011 and the second liquid injection hole 3012 are cylindrical holes, and the first liquid injection hole 3011 and the second liquid injection hole 3012 are coaxially arranged. During assembly, especially in liquid injection, consistency of liquid levels of the electrolyte can be well determined; at least when the liquid levels of the electrolyte rise to a central axis of the first liquid injection hole 3011 and the second liquid injection hole 3012, it may be determined that the liquid levels of the electrolyte within the accommodation cavities 400 are consistent.

Furthermore, an inner diameter of the first liquid injection hole 3011 is the same as that of the second liquid injection hole 3012, and the first liquid injection hole 3011 and the second liquid injection hole 3012 may further be coaxially arranged, to better control the liquid injection volume and the liquid levels of the electrolyte.

In the foregoing embodiments of the present invention, the block mechanism 302 is spherical, an outer diameter of the block mechanism 302 is greater than an outer diameter of the first liquid injection hole 3011 and/or the second liquid injection hole 3012, so that the spherical block mechanism 302 can better close the first liquid injection hole 3011 and/or the second liquid injection hole 3012 to block connection between two adjacent accommodation cavities 400.

In this embodiment, as shown in FIG. 7, when the spherical block mechanism 302 closes the first liquid injection hole 3011 and/or the second liquid injection hole 3012, an upper side of the spherical block mechanism 302 is at least partially located inside a first space, and a lower side of the block mechanism 302 is at least partially located inside a second space. A part, located inside the closed space, of the spherical block mechanism 302 closes the first liquid injection hole 3011 and/or the second liquid injection hole 3012, and both the upper and lower sides are located outside the closed space. The block mechanism 302 can better work in the closed space through interference fit and completely close the first liquid injection hole 3011 and/or the second liquid injection hole 3012.

In the present invention, to isolation of the first liquid injection hole 3011 and/or the second liquid injection hole 3012 by the block mechanism 302, the block mechanism 302 is in an interference fit connection with an inner wall of the block mechanism placement space 303, so that the block mechanism 302 can seal at least one internal opening, corresponding to the closed space, of the first liquid injection hole 3011 and/or the second liquid injection hole 3012.

In this embodiment, the block mechanism 302 is disposed inside the separator 300 and located inside the housing 100. In an assembly process of the battery 10, the separator 300 with the block mechanism 302 is generally first combined with the battery core set 200, and then placed into the housing 100 together. After the assembly, a liquid injection operation is performed inside the housing 100, and the sealing step is performed after the liquid injection. Therefore, how to adjust the block mechanism 302 that has been disposed inside the separator 300 from a non-sealing position to a sealing position while ensuring reliability of the sealing is a key problem in a solution of disposing the block mechanism 302 inside.

In an embodiment of the present invention, a magnetic sealing body with magnetism is selected as the block mechanism 302 of the present invention. In a manufacturing process of the battery 10, the block mechanism 302 is placed in the separator 300, and the separator 300 is provided with a block mechanism placement space 303. Since the block mechanism 302 is magnetic, after the liquid injection, a magnetic field is applied to the block mechanism 302 to generate a suction force that moves the block mechanism 302 from the first position to the second position. In this solution, through an action of the applied magnetic field, and using a magnetic force as an external force to the block mechanism 302, the block mechanism 302 can be moved well without performing other structural designs for the separator 300. In addition, by controlling the magnitude of the magnetic field, a strength of the external force applied to the block mechanism 302 can be adjusted. Therefore, the applied force can be adjusted differently in different application scenarios to ensure the sealing effect of the block mechanism 302.

Generally, a magnetic substance with magnetism has high hardness and toughness, and the separator 300 generally has high toughness and hardness for connection and support. However, in the present invention, the block mechanism 302 needs to be packaged inside the separator 300 through interference fit; when the block mechanism 302 and the separator 300 both have high hardness, the two cannot implement effective interference fit, and the sealing effect is not good. Therefore, in an embodiment of the present invention, the magnetic sealing body is covered by an insulation layer outside, for example, a rubber layer. The rubber layer has a good deformation effect, so that the interference fit between the sealing body and the separator 300 can be effectively implemented, and the sealing effect and reliability can be ensured.

In an embodiment of the present invention, as shown in FIG. 5 or FIG. 6, the block mechanism 302 may be in any shape of a cylinder, an elliptical cylinder, a sheet, or a sphere.

In an embodiment of the present invention, a length of the lithium-ion battery 10 extends along a first direction, and the first direction is a length direction of the lithium-ion battery 10.

Figure 12:
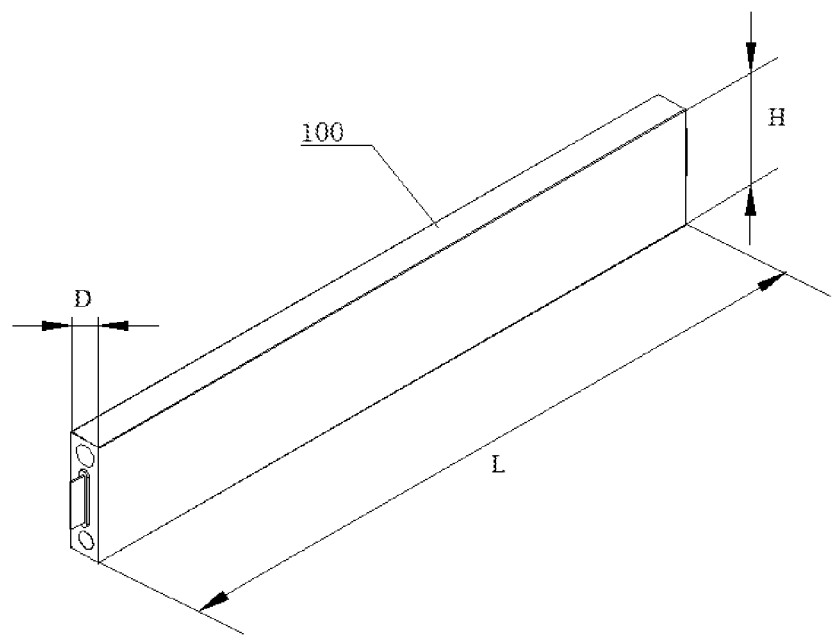
FIG. 12 is a schematic diagram of an overall structure of a lithium-ion battery according to an embodiment of the present invention.

As shown in FIG. 12, the lithium-ion battery 10 is roughly rectangular, the lithium-ion battery 10 has a length L, a height H, and a depth D, the length L is greater than the height H, the height is greater than the depth D, and the length of the lithium-ion battery 10 is 400 to 2500 mm.

A ratio of the length to the height of the lithium-ion battery 10 is 4 to 21.

It should be noted that, that the battery is roughly rectangular may be understood as that, the battery may be in a rectangular shape, a square shape, or in a rough rectangular shape or square shape with local deformation, or in an overall approximate rectangular or square shape with some gaps, protrusions, chamfers, arcs, or bending.

As shown in FIG. 3 or FIG. 4, in the lithium-ion battery 10 provided in the present invention, a tab 202 of the battery core 201 is connected to the battery core connector 500, which, for example, may be overlaid superimposed and soldered to form a power connection area 203.

As shown in FIG. 6 and FIG. 7, in an embodiment of the present invention, the block mechanism 302 is a metallic ball 3026 with a rubber sleeve 3025. In this solution, the metallic ball 3026 ensures the sealing strength, and the rubber sleeve 3025 improves the sealing tightness.

In a specific embodiment of the present invention, each battery core set includes a first electrode lead-out part and a second electrode lead-out part that are used to lead out a current, and a first electrode lead-out part and a second electrode lead-out part of at least one battery core set are disposed on two opposite sides of the battery core set along a first direction; and a length direction of the battery core set extends along the first direction. The first electrode lead-out part and the second electrode lead-out part may be lead-out parts form through combination with and soldering to the tabs 202.

Figure 11:
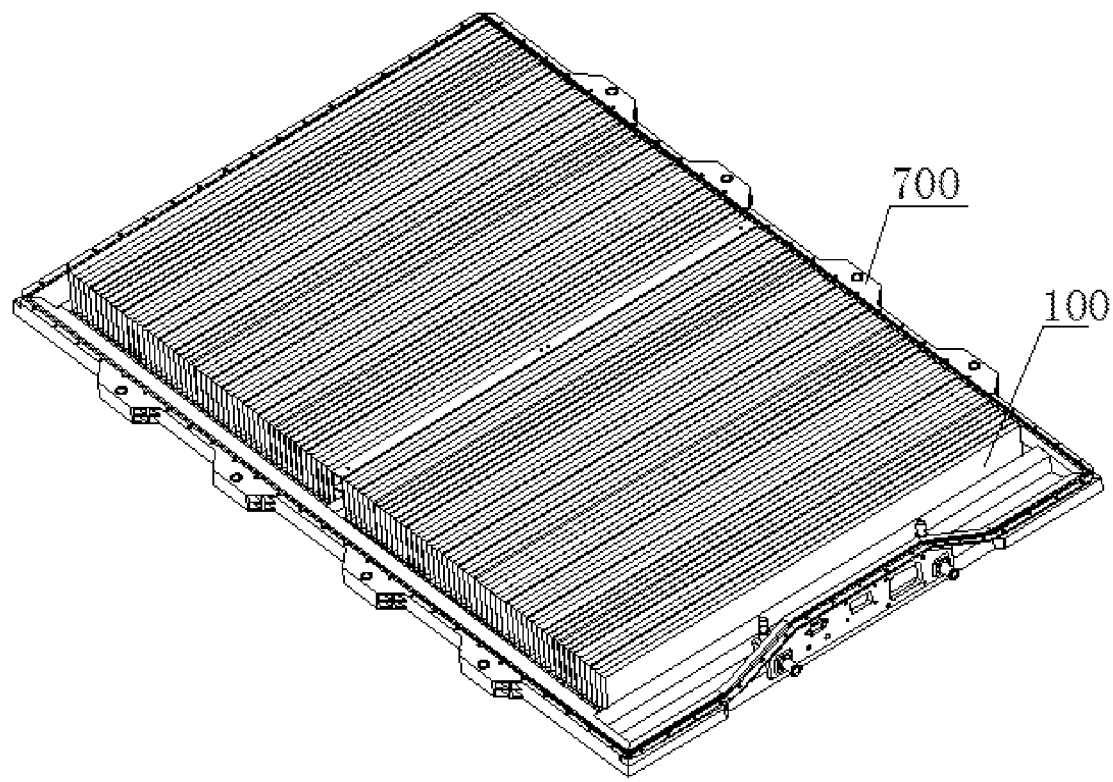
FIG. 11 is a schematic structural diagram of a battery pack according to an embodiment of the present invention.

As shown in FIG. 11, the present invention provides a battery pack, including a tray 700 and a lithium-ion battery 10 arranged on the tray 700.

The present invention further provides a battery module, including a plurality of lithium-ion batteries 10 provided in the present invention.

The present invention further provides a battery pack, including a plurality of lithium-ion batteries 10 provided in the present invention or the battery module provided in the present invention.

The present invention further provides an automobile, including the battery module or the battery pack provided in the present invention.

From the foregoing descriptions, it can be known that the present invention is a product of great practical value, which has the excellent features mentioned above, and can be used to achieve effects not seen in the prior art.

Described above are only exemplary embodiments of the present invention and not intended to limit the present invention. Any modification, equivalent replacement, or improvement made without departing from the ideas and principles of the present invention shall be encompassed in the protection scope of the present invention.

What is claimed is:

1. A lithium-ion battery, comprising:
   a housing;
   at least one separator located inside the housing and separating an internal space of the housing into a plurality of accommodation cavities; wherein at least one separator defines a liquid injection hole for electrolyte passage, and connecting two adjacent accommodation cavities on opposite sides of the separator;
   at least two or more battery core sets disposed inside corresponding accommodation cavities and connected in series, wherein the battery core sets each comprise at least one pole shank; and
   a block mechanism inside the housing for control of the liquid injection hole.

2. The lithium-ion battery according to claim 1, wherein when the block mechanism is in a first situation, the liquid injection hole is open, when the block mechanism is in a second situation, the liquid injection hole is closed, and the block mechanism switches between the first situation and the second situation.

3. The lithium-ion battery according to claim 2, wherein before or during liquid injection of the lithium-ion battery, the block mechanism is in the first situation; and after the liquid injection of the lithium-ion battery, the block mechanism switches from the first situation to the second situation.

4. The lithium-ion battery according to claim 2, wherein the separator is provided with a block mechanism placement space, the block mechanism is located inside the block mechanism placement space, a first position and a second position are formed in the block mechanism placement space, and the block mechanism moves between the first position and the second position under an external force; when the block mechanism is located at the first position, the liquid injection hole is open; and when the block mechanism is located at the second position, the block mechanism closes the liquid injection hole.

5. The lithium-ion battery according to claim 4, wherein in the first situation, the block mechanism is of a net structure provided with mesh holes that keep the liquid injection hole open; and in the second situation, the block mechanism of the net structure is hot-melted, and the mesh holes of the block mechanism of the net structure are all closed due to hot melting.

6. The lithium-ion battery according to claim 1, wherein the housing comprises a housing body and a cover plate, wherein the housing defines an opening on an end, along a first direction, of the housing, and the cover plate, defining a liquid injection channel, is provided at the opening; and the separator separates the internal space of the housing along the first direction into the plurality of accommodation cavities, and the battery core sets are arranged along the first direction, wherein each battery core set comprises a first electrode lead-out part and a second electrode lead-out part leading out a current, and a first electrode lead-out part and a second electrode lead-out part of at least one battery core set are arranged along the first direction on two opposite sides of the battery core set respectively; and a length direction of the battery core set extends along the first direction, wherein the first direction is a length direction of the lithium-ion battery.

7. The lithium-ion battery according to claim 1, wherein the battery comprises a battery core connector, and the battery core sets are connected in series by using the battery core connector, wherein the battery core connector passes through the separator between two corresponding adjacent battery core sets.

8. The lithium-ion battery according to claim 1, wherein the housing is a metal housing, the battery further comprises an isolating film, the isolating film is located between the housing and the battery core sets, and the isolating film and the separator form the accommodation cavities.

9. The lithium-ion battery according to claim 1, wherein the housing is a metal housing, the battery further comprises an isolating bag, the battery core sets are located inside the isolating bag, and the separator separates internal space of the isolating bag into a plurality of accommodation cavities.

10. A lithium-ion battery, comprising:
a housing;
at least one separator located inside the housing and separating an internal space of the housing into a plurality of accommodation cavities;
at least two or more battery core sets disposed inside the accommodation cavities and connected in series, wherein a battery core set of the at least two or more battery core sets comprises at least one pole shank;
at least one separator defining a liquid injection hole for allowing an electrolyte passage and connecting two adjacent accommodation cavities on two opposite sides of the separator; and
a block mechanism at least partially located in the liquid injection hole for control the liquid injection hole, to block communication between the two adjacent accommodation cavities through the liquid injection hole.

11. The lithium-ion battery according to claim 10, wherein a plurality of separators are disposed inside the housing, each separator is disposed between two adjacent battery core sets, the plurality of separators separate the internal space of the housing into the plurality of accommodation cavities, and each accommodation cavity receives at least one battery core set.

12. The lithium-ion battery according to claim 10, wherein at least one separator defines a block mechanism placement space, the block mechanism is located inside the block mechanism placement space, a first position and a second position are provided in the block mechanism placement space for accommodating the block mechanism, the block mechanism is located at the second position, and the block mechanism is switchable between the second position and the first position under an external force.

13. The lithium-ion battery according to claim 10, wherein the housing comprises a housing body with an opening on an end portion and a cover plate disposed at the opening of the housing body, the opening is located on the end portion of the housing along a first direction, and the cover plate defines a liquid injection channel; and the separator separates the internal space of the housing along the first direction into the plurality of accommodation cavities, and the battery core sets are arranged along the first direction and connected in series.

14. The lithium-ion battery according to claim 10, wherein each battery core set comprises a first electrode lead-out part and a second electrode lead-out part, and a first electrode lead-out part and a second electrode lead-out part of at least one battery core set are respectively arranged on two opposite sides of the battery core set along the first direction; and a length direction of the battery core set extends along the first direction, wherein the first direction is a length direction of the lithium-ion battery, the lithium-ion battery is roughly rectangular, the lithium-ion battery has a length, a height, and a depth, the length is greater than the height, the height is greater than the depth.

15. The lithium-ion battery according to claim 14, wherein the length of the lithium-ion battery is 400 to 2500 mm.

16. The lithium-ion battery according to claim 10, wherein the battery comprises at least one battery core connector, and the battery core sets are connected in series by using the at least one battery core connector, a corresponding battery core connector passes through the separator between the two adjacent battery core sets and integrally formed with the separator.

17. The lithium-ion battery according to claim 10, wherein the battery core connector comprises a copper connection portion and an aluminum connection portion connected to the copper connection portion, and a connection position between the copper connection portion and the aluminum connection portion is inside the separator.

18. The lithium-ion battery according to claim 16, wherein the housing is a metal housing, the battery further comprises an isolating film, the isolating film is located between the housing and the battery core sets, and the isolating film and the separator form the accommodation cavities.

19. A battery pack, comprising a plurality of lithium-ion batteries according to claim 1.

20. An automobile, comprising the battery pack according to claim 19.

* * * * *